Sept. 16, 1930.  W. E. AIKMAN  1,775,924
THEFT PREVENTING APPLIANCE
Filed April 28, 1928  2 Sheets-Sheet 1
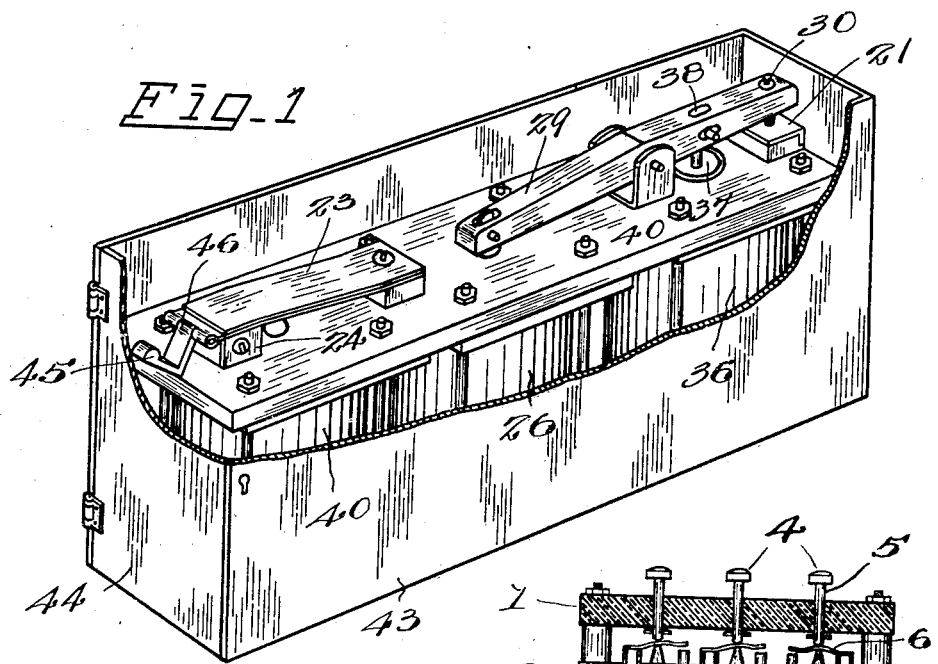
William E. Aikman  Inventor
By Herbert E. Smith
Attorney

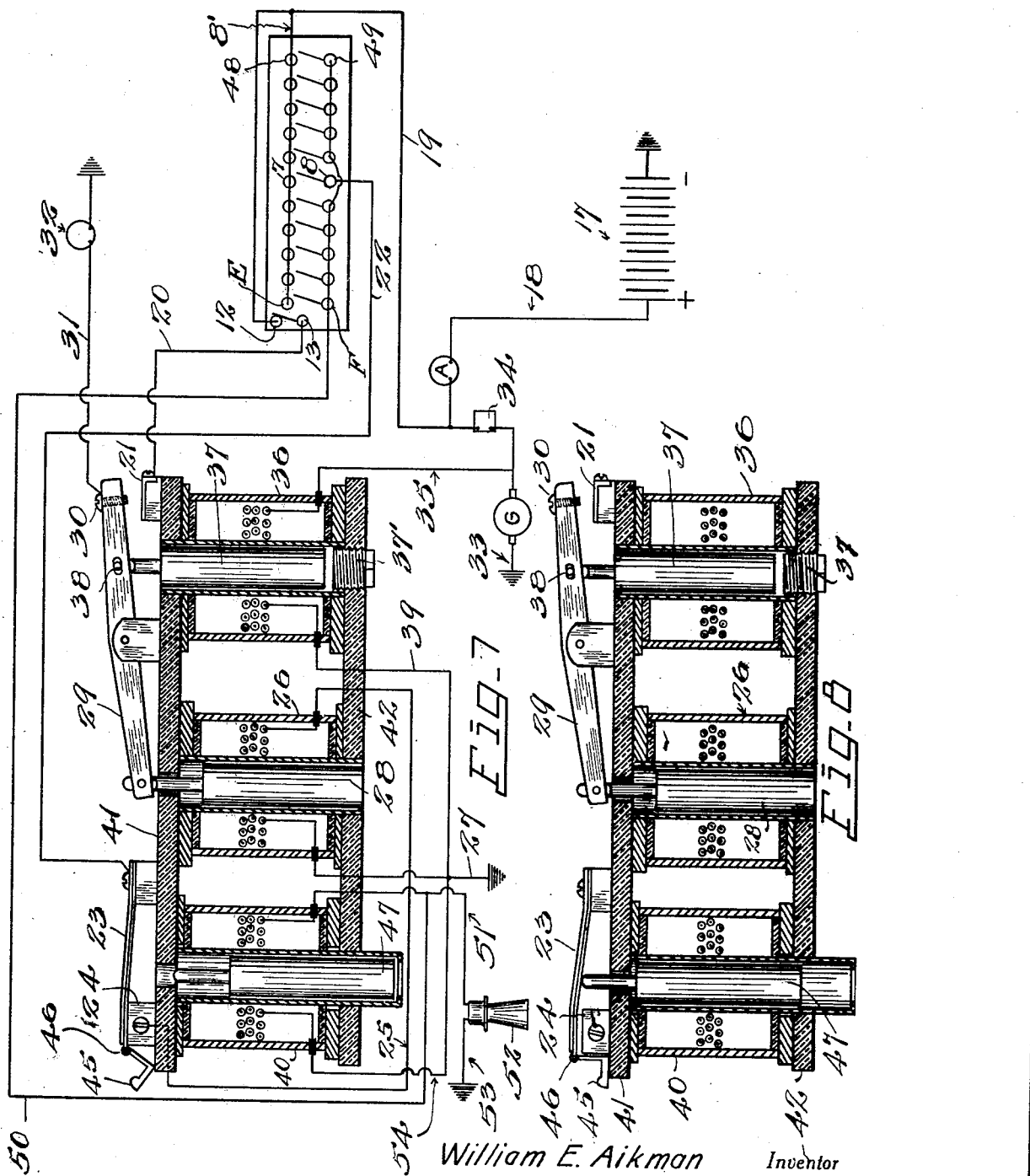

Patented Sept. 16, 1930

1,775,924

UNITED STATES PATENT OFFICE

WILLIAM E. AIKMAN, OF ST. MARIES, IDAHO

THEFT-PREVENTING APPLIANCE

Application filed April 28, 1928. Serial No. 273,567.

My present invention relates to improvements in theft preventing appliances for use in connection with automotive vehicles, and of the electrically operated type utilized in connection with the ignition system of the vehicle. As herein illustrated, an audible signal, which may be the usual horn, is sounded as an alarm by the act of closing any one of a plurality or number of normally open electric switches in an unsuccessful attempt, as by an unauthorized person, to start the motor of the vehicle, and the ignition device for controlling the supply of energy to the spark plugs is also locked in inoperative position.

In carrying out my invention I utilize a number of similar electric switches and duplicate push buttons on a switch board that is conveniently arranged for access by the driver of the automobile, and one of these switches and its complementary push button controls the ignition circuit of the motor in order that the authorized person or persons may with usual facility start and stop the motor or engine of the vehicle. By the use of a number of similar or duplicate switches, an unauthorized person, or one unfamiliar with the identity of the ignition switch, has for instance, one chance in thirty of touching the correct button to turn the current of the ignition circuit, and the changes are thirty to one that he will sound the alarm and lock the ignition control device, thus thwarting an attempted theft of the vehicle. After the ignition switch has been locked, due to an unsuccessful attempt to close it, the open, locked switch can be unlocked only by the use of a key giving access to the interior of a box or casing containing electro-magnetic control devices, and located in a hidden or obscure part of the vehicle.

In the embodiment of my invention a normally open, low tension, actuating circuit including the usual battery, is provided, together with electro-magnetic control devices for closing the open low tension ignition circuit to the primary coil, and after the latter has been closed, the actuating circuit is automatically cut out, and the usual high tension circuit is maintained from the generator for the electrical systems of the vehicle, including of course the ignition system, for the motor.

A plurality of similar low tension signal circuits are also used together with normally open switches and electro-magnetic control devices, and upon the closing of one of the signal switches, the alarm is sounded and the electro-magnetic devices are energized for the purpose of locking the ignition control devices with the ignition circuit open.

A mechanical lock is electrically actuated for holding open the ignition circuit after an unsuccessful attempt to start the motor and this lock is enclosed within a box or cabinet, the door of which may be opened only by the use of a key to give access to the lock.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a perspective view of the locked box or cabinet containing the electro-magnetic control devices and the mechanical lock, parts being broken away for convenience of illustration. Figure 2 is a perspective view of the switch board located at a place easy of access to the driver of an automobile. Figure 3 is a sectional view of the switch board, as at line 3—3 of Figure 2.

Figure 4 is an enlarged sectional detail view showing the lower panel of the switch board and one of the normally open switches.

Figure 5 is a sectional detail view of part of the switchboard showing the stop switch, normally closed, that is opened to break the ignition circuit and stop the motor.

Figure 6 is a bottom plan view of the lower panel of the switch board.

Figure 7 is a sectional view of the electro-magnetic devices, together with the wiring for the low tension actuating circuit, the ignition circuit and the signal circuits.

Figure 8 is a sectional view of the electro-magnetic control devices with the lock in position to prevent closing of the open ignition circuit.

The switch board, including its panels 1 and 2, is of suitable size and shape to accommodate a comparatively large number of switches, and is located in a place where it is readily accessible to the driver of an automobile, as on the instrument board of the vehicle. The switch board is equipped with a number of depressible buttons of which the button 3 may control the ignition circuit and the remaining buttons 4 will control the signal circuits and the lock device for the ignition circuit. All of the buttons have the same appearance, and only a person familiar with the correct location of the button 3 will be enabled to turn on the ignition, as the depressing of any button but 3 will sound the alarm and lock the ignition system. The buttons control normally open switches each of which includes the stem 5 of the button and a conductor or switch plate 6 which is secured at one end to the terminal screw or post 7 and adapted to be pressed into contact at its free end with another terminal post 8, the two posts or terminals being supported in the lower panel 2 of the switchboard. The resilient plate 6 is normally held out of contact from the terminal 8 by means of a plunger 9 and its spring 10 supported in panel 2 and a bus wire 8' connects these normally open switches as indicated in Figure 6.

In Figure 5 a similarly constructed switch is illustrated, for the stop switch by means of which the motor is stopped, and this switch comprises a button 11 and posts 12 and 13 supported in the switch panel 1, the button being depressible against the resilient blade 14 secured at one end to the terminal 13. These switch members are normally held in closed contact by means of the plunger 15 and its spring 16 supported in the panel 2 of the switchboard.

A low tension operating circuit is controlled by the ignition button 3, which circuit includes the battery 17 from which the wire 18 leads to the ammeter A, and thence the wire 19 leads to the normally open switch members 12—13 and to the branch or bus wire 8' as seen in Figure 7. From the stop switch members 12—13 a wire 20 is extended to the contact plate 21, and from the ignition switch a wire 22 is extended to a resilient conductor plate 23 that normally rests upon the conductor block 24, and this block is connected by wire 25 to the intermediate electro-magnet 26, the magnet being grounded by means of wire 27 extended therefrom. The magnet 26 is provided with a core 28 which is pivoted at one end of an insulated rock-arm 29 and this rock arm at its free end is provided with a contact member 30 for co-action with the contact plate 21 to form a single pole switch. The wire 31 is connected to the contact member 30 and thence leads to the primary of the spark coil indicated at 32 and grounded in usual manner. The switch 30—21 opens and closes the primary circuit of the spark coil.

To start the car through the motor, the ignition circuit is of course first closed, and this is accomplished through the closing of the low tension starting circuit by pressing the starting button 3 to close its switch 7—8, and when this is done, the current flows from the battery 17 through wire 18, ammeter A and wire 19 to and through the normally closed stop switch 12—13, and thence by wire 20 to the stationary contact plate 21 of the ignition switch 21—30, which is as yet open. The current also flows through bus wire 8' to the closed starting switch 7—8, thence by wire 22 to the resilient conductor plate 23 of the normally closed lock switch 23—24, and through this switch and wire 25 to the starting magnet 26 to energize the latter. When the magnet 26 is energized, its movable core 28 is elevated to rock the arm 29 on its pivot and cause the movable contact member 30 to contact with plate 21 thus closing the ignition switch 21—30 to start the motor.

The generator G is grounded as at 33 to complete the circuit to the primary winding. A normally closed cut-out switch 34 is located in the low tension circuit, and this switch is opened when the voltage from the generator G becomes greater than that of the low tension circuit from the battery, and the current from the battery is thus replaced by the current from the generator.

By means of wire 35 from the generator a holding electro-magnet 36 is energized to influence its core 37 that is pivoted at 38 to the rock arm 29. As the rock arm 29 swings to close the ignition circuit 21—30 the core 37 is depressed against a stop plug or screw 37' and the core 37 is retained in this position when the magnet 36 is energized from the generator, the current flowing through the magnet and thence by wire 39 to the ground at 27.

After the motor has started, pressure is released from the starting button 3 and the starting switch 7—8 is opened to break the low tension current, and the ignition switch 21—30 is held closed by the energized holding magnet 36.

To stop the motor, the normally closed stopping switch 12—13 is opened by depressing the button 11, for breaking the circuit between the generator G and the ignition switch 21—30, and the cut out switch 34 again closes.

In addition to the starting magnet 26 and the holding magnet 36, a third magnet 40 for locking the ignition circuit, is enclosed between the two insulated plates 41 and 42 within the cabinet or box 43 that is located at a suitable place in the automobile. The box is provided with a hinged door 44 that is locked and may be unlocked by the use of a key to gain access to the mechanical lock 45 that is pivoted at 46 to the free end of the resilient conductor plate 23 and which normally rests upon the block 24 to form the electrical locking switch member. The lock 45 is a conductor which rests on the insulating strip.

The lock 45 is of angular shape and under normal conditions is designed to rest upon the insulated board 41 in the position indicated in Figure 7 with the electric locking switch 23—24 closed. The resilient blade 23 is adapted to be lifted from electrical contact with the block 24 by action of the core or plunger 47 within the magnet 40, and as the height of the lock 45 is greater than the height of the block 24, when the blade 23 and its hinged lock device 45 are lifted by the plunger, the lock swings by gravity to the position of Figure 8 where it is holding the blade out of contact from the block 24 and the locking switch is open, thus breaking the low tension ignition circuit.

With the locking switch 23—24 held open, the ignition circuit cannot be closed, and therefore the motor of the automobile cannot be operated.

Should the wrong button be depressed, and switch members as 48—49 in Figure 7 be thus closed, current from the battery will flow through wire 18, ammeter A and wire 19 to the bus wire 8', thence to switch 48—49 and by wire 50 to the magnet 40, the locking magnet or signal magnet, and the current also flows by wire 51 to the horn 52 which is grounded at 53. From the signal magnet 40 the low tension current passes through wire 54 and through wire 27 to the ground, thus completing the signal circuit and locking the locking mechanism. The audible signal is sounded as an alarm, and the open ignition circuit is locked in this condition.

When the signal magnet 40 is energized, its plunger or core 47 is lifted from its position in Figure 7 to that of Figure 8, and its upper end strikes the blade 23, lifting it from the contact block 24 to open the signal circuit switch or locking switch. As the blade is lifted the angular lock 45 swings by gravity from its position in Figure 7 to its position in Figure 8 where it rests flatly upon the insulating plate 41, and holds the blade out of contact from block 24, thus mechanically locking and holding open the ignition circuit.

The starting magnet 26 is thus cut off from any current, and as the leverage of arm 29 to core 28 is longer or greater than its leverage to core 37 of holding magnet 36, and as the weight of cores 28 and 37 is the same, it will be apparent that core 28 acts as a weight to hold the movable contact 30 of the ignition switch open from plate 21.

No attempt has been made in the drawings to show a complete ignition system for the motor of an automobile, as the invention contemplates the introduction of my device into the low tension or primary line that supplies the current to the ignition system.

The electro-magnetically operated switch mechanism may be, and is used, without affecting the standard ignition systems, by removing the wires from the usual switch on the automobile and attaching them to the switch 30—12.

When the engine or motor is stopped, the voltage of the generator G falls to zero and consequently coil 36 is de-energized, its core 37 is released from stop core 37', and the weight of the core 28 causes core 37 to rise, and open the switch 30—21. Cores 37 and 28 are of the same size and weight, but they are pivoted on the rock arm 29 in such manner that in the absence of magnetic attraction between core 37 and stop core 37', core 28 will fall and core 37 will rise, to open switch 30—21.

When button 3 in Figure 2 is depressed, contacts 7 and 8 are electrically connected, and the path of the current flows from battery 17 through wire 18 and ammeter A to wire 19, and thence through wire 8' along the row of contacts to the terminal 7. With the contacts 7 and 8 connected, the path of the electric current is then through 7 and 8 to wire 22 in Figure 7, thence through plate 23 and block 24 and post 24' of the protected relay switch to wire 25. Wire 25 is connected to the binding post of magnet 26, and the current passes around the magnet windings to ground 27 and back to the negative side of the battery.

Magnet 26 is an electro-magnet of the solenoid type, and when current flows through its windings, the energized magnet pulls core 28 upwardly until the core is approximately centered in the windings. The rising movement of core 28 causes descent of core 37, and closes the switch 30—21.

The lowering of core 37 is stopped by the adjustable plug or core-stop 37' and the latter may be adjusted by its screw threads to insure proper movement of the core 37.

After the switch 30—21 is closed, the path of the electric current from the primary winding of the ignition coil is from the positive pole of battery 17, through wire 18, ammeter A and wire 19 to contact points 12 and 13, thence by wire 20 through the switch 21—30 and wire 31 to the primary spark coil 32, thence through the primary winding and interrupter to the ground and back to the negative pole of the battery 17, supplying current to the primary of the spark coil or induction coil. Since the secondary circuit of the ignition system has not been altered, the motor is ready to be started, and the starting of the motor is accomplished in usual manner.

As soon as the motor starts, button 3 is released, and therefore no more current can flow through the coils of magnet 26, but the switch 30—21 remains closed for the reason that the generator G is now sending current through the windings of the magnet 36 which magnet holds the core 37 to its seat 37' and holds switch 30—21 closed. The switch is thus closed while the generator is running and of course the generator runs while the motor is operating.

The path of the current through magnet is from the positive brush, of the generator G through wire 35 to the binding post on magnet 36 and through this magnet and wire 39 to the ground wire 27 and negative brush of the generator.

Wire 35 of the magnet 36, as seen in Figure 7, is connected to the system between the generator brush and the reverse current relay or cut out 34. This relay or cut out is standard equipment on modern automobiles, and is provided to disconnect the battery and generator at low car speeds, or when the voltage of the generator is less than that of the battery.

Should an attempt be made to start the engine by depressing any button, other than 3, current will flow from the positive pole of battery 17, through wire 18 to the ammeter A, wire 19 to bus wire 8' and along the row of contact to the points E and F (assuming these to be the points that are contacted by depressing the wrong button). From point F the current passes through wire 50 and wire 51 to the magnet or protective relay 40, out through wire 54 to the ground wire 27. At this time current also flows through wire 51 to the horn 52, which is grounded at 53, and the horn is sounded.

As the current flows through the windings of magnet 40, the core 47 is lifted with considerable force, and the stem at the top of the core strikes the resilient plate 23, raising the latter and permitting the lock hook 45 to swing to the right as in Figure 8. By the pivoted lock 45 the circuit is held open, and it is impossible, to close the switch 30—21 without opening the door 44 to gain access to the interior of the box 43.

To reset the mechanism the door 44 must be unlocked and open to gain access to the lock 45 for restoring the lock to its normal position in Figure 7.

In Figure 6 it will be observed that the panel 2 has six rows of contacts for the switches, while panel 1 shows three complementary rows of depressible switch buttons, and the rows of contacts on panel 2 are wired parallel with one another by the bus wire 8'. Thus when starting button 3 is depressed, the starting switch 7—8 of Figure 7 is closed and the switch is included in the low tension starting circuit for starting magnet 26, but when an incorrect or wrong button 4 is depressed, the signal switch 48—49 is included in the locking circuit to energize the locking magnet 40 with the results above set forth.

Various changes and alterations may be made in the exemplification shown in the drawings, and such changes, within the scope of my claims may be made without departing from the principles of my invention. For instance, if desired, the electrical wiring for the headlights of the vehicle may be included in a circuit or circuits so that the lights may be affected by the actuation of the signal and lock circuits.

Having thus fully described my invention, what I claim as new and desire to secure by Letters Patent is:—

1. In a theft preventing apparatus, the combination with an ignition circuit and its open switch, a starting circuit and switch and a starting electro-magnet in the circuit for closing the ignition switch, of a low tension locking circuit and its closed switch and electro-magnetically controlled means for opening said switch, and a mechanical lock device for holding said switch open.

2. In a theft preventing apparatus the combination with an ignition circuit and its open switch, of a starting switch and its circuit and an electro-magnet for closing the open ignition switch, a normally closed locking switch in the starting circuit and an electro-magnet for opening said switch, and mechanical means for locking the last mentioned switch in open position.

3. In a theft preventing apparatus the combination with an ignition circuit and its open switch, of a starting circuit and a single switch therefor, a closed locking switch in said circuit, a locking circuit and a plurality of locking switches in said circuit, an electro-magnet in the locking circuit for opening the normally closed locking switch, and mechanical means for holding open the open locking switch.

4. In a theft preventing apparatus the combination with an ignition circuit and its open switch, of a starting circuit and its switch and an electro-magnet in said circuit for closing the ignition switch, an electro-magnet and connections for holding said switch in closed position, a normally closed locking switch in the ignition circuit, and electro-magnetic mechanism in the locking circuit for opening said normally closed locking switch.

5. In a theft preventing apparatus, the combination with an ignition circuit having an open switch and a normally closed locking switch, of a starting circuit and its switch and an electro-magnet in said circuit for closing the ignition switch, an electro-magnet and connections for holding said switch in closed position, an electro-magnet for opening the locking switch and a low tension circuit having a battery therein for energizing said magnet, and mechanical means for holding open said locking switch.

6. In a theft preventing apparatus, the combination with an ignition circuit having an open switch and a closed locking switch, of a starting circuit and its switch and an electro-magnet for closing the ignition switch, an electro magnet in the locking circuit for opening the locking switch, and a gravity actuated lock for holding open said locking switch.

In testimony whereof I affix my signature.

WILLIAM E. AIKMAN.